United States Patent [19]

Ryder

[11] 4,285,657

[45] Aug. 25, 1981

[54] INJECTION BLOW MOLDING APPARATUS

[76] Inventor: Leonard B. Ryder, 5 Sharon Dr., Whippany, N.J. 07981

[21] Appl. No.: 99,927

[22] Filed: Dec. 3, 1979

[51] Int. Cl.³ .............................................. B29C 17/07
[52] U.S. Cl. .................................... 425/525; 264/520; 264/528; 264/529; 264/537; 425/526; 425/529; 425/530; 425/533; 425/535
[58] Field of Search ............... 425/525, 526, 529, 530, 425/533, 538, 535; 264/537, 520, 529, 530, 528

[56] References Cited

U.S. PATENT DOCUMENTS

| | | | |
|---|---|---|---|
| 3,776,991 | 12/1973 | Marcus | 264/538 X |
| 3,819,314 | 6/1974 | Marcus | 425/526 |
| 4,065,246 | 12/1977 | Marcus | 425/533 X |

*Primary Examiner*—Jan H. Silbaugh
*Attorney, Agent, or Firm*—Edward M. Fink

[57] ABSTRACT

Molecular biaxially oriented hollow articles are obtained by injection blow molding using a novel apparatus. The technique involves the use of an inline, single stage injection blow molding apparatus wherein injection molding and cooling, and conditioning and stretch blow molding of parisons are all performed simultaneously at a single station at different positions within that station.

9 Claims, 7 Drawing Figures

INJECTION BLOW MOLDING APPARATUS

BACKGROUND OF THE INVENTION

This invention relates to the art of injection blow molding, and more particularly relates to injection blow molding methods and apparatus suitable for producing molecular biaxially oriented hollow articles from thermoplastic materials.

It is well known to those skilled in the art that molecular orientation substantially improves the stiffness, ultimate tensile strength, yield strength, impact resistance, clarity, and permeation resistance of many thermoplastic materials. Molecularly oriented articles having these improvements have great commercial significance. For example, high strength plastic strapping is that which possesses a high degree of molecular orientation in its length direction by virtue of having been uniaxially stretched, at the polymer orientation temperature, in the machine direction. "Mylar" plastic film and sheet produced by the DuPont Company possesses outstanding strength properties and permeation resistance as a result of inherent high levels of biaxial molecular orientation, molecular orientation along two perpendicular axes of the film or sheet. In this case the film or sheet is oriented in the so-called machine direction, in which it is originally extruded and stretched, and then oriented by stretching in the cross machine direction. The degree of molecular orientation and the strength of the film or sheet in either of its two perpendicular directions is directly proportional to the amount of stretching imposed upon it in that particular direction. Molecular orientation may be either balanced or unbalanced in the two directions depending upon whether the film or sheet has been stretched equally or unequally in each direction.

Another commercially important plastic product which is biaxially oriented is the so-called "PET" plastic carbonated soft drink bottle which is produced from polyethylene terephthalate. The composition, physical and other properties of this bottle are typical of that taught in U.S. Pat. No. 3,733,309 issued May 15, 1973 and entitled "Biaxially Oriented Poly (Ethylene Terephthalate) Bottle." The majority of the biaxially oriented PET beverage bottles are presently being produced by the so-called two stage "reheat blow" method, using a separate machine for each stage. In a first stage injection molding machine, PET parisons or preforms are first injection molded in a cooled mold, at melt temperatures of about 540° F., which is above the polymers melting point, and then cooled down and removed from the injection molding machine for later use as feed stock to a separate second stage reheat-blow machine, where the biaxially oriented bottle is produced. Upon entering the reheat blow machine, the cold parisons, whose shape resembles that of a test tube having a threaded bottle neck finish at its open ended top, are heated uniformly in an oven to its orientation temperature, which for PET is about 190° F. to 200° F. (which is below PET's melting point). The temperature conditioned parisons are then placed within cooled bottle blow molds which clamp the parisons by their necks upon closing of the blow molds. Metal pushrods are then inserted and pushed into the parisons through their open necks, and the parisons, whose initial lengths are shorter than that of the finished bottle, are stretched axially against the bottom of the blow molds to their final lengths, thereby effecting axial or longitudinal orientation. Radial or so-called "hoop direction" orientation is next achieved by introducing compressed air inside the axially stretched parisons to expand them outward and into contact with the cooled surfaces of the bottle blow molds. After cooling sufficiently for subsequent handling, the blow molds open and the biaxially oriented bottles are ejected from the machine. While this method is suitable for use with orientable thermoplastic, it requires a substantial capital investment in the injection molding machine and the reheat blow machine and its associated parison transfer equipment and heating ovens. Furthermore, a considerable amount of energy is consumed in reheating the cold parisons in the oven, which adds to the cost of the finished oriented articles.

It has long been recognized that the reheating step can be avoided if a so-called in-line single stage injection blow molding process were utilized to make biaxially oriented hollow articles using a single "hot parison" injection stretch-blow molding machine. In the "hot parison" in-line method, the parison is formed by injection molding, cooled to orientation temperature, and then stretched axially and blown radially to its final product shape, without ever being allowed to cool to room temperature. A number of such in-line "hot parison" injection stretch blowing methods and apparatus have been disclosed in the patent literature and as such constitute the prior art.

As set forth in U.S. Pat. No. 3,470,282 issued Sept. 30, 1969 to A. J. Scalora, a hot thermoplastic parison is first formed by injection molding the thermoplastic material, at a temperature above its melting point, over a generally cylindrical core, called an inner sleeve, which is positioned in the female cavity of an injection mold. The parison is then cooled, while on the core and within the injection mold, by suitable cooling means located therein, down to a narrow temperature range, which includes the preferred orientation temperature of the material being processed, said temperature range being relatively uniform and covering all points across the thickness and at the surfaces of the parison, and said temperature range also being below the thermoplastic materials homogenous melting temperature. The narrow temperature range for PET parisons would be about 190° F. to 200° F. After reaching its narrow orientation temperature range, the uniformly cooled parison is then removed from the injection mold and transferred, while still on the inner core, to a blow mold having cooling means therein. While in transit, or after being positioned within the closed blow molds, the parison is stretched axially by the outward extension of a valve located within the inner core over which the parison had been previously molded. Next, the parison is inflated, while positioned within the blow molds, thus stretching the parison along a second axis which is perpendicular to the longitudinal axis or direction of axial stretching. Stretching the thermoplastic parison at its orientation temperature, by longitudinal or axial extension of a valve within the core rod, and by radial inflation, sometimes referred to as "hoop stretching," yields a biaxially oriented hollow article.

The arrangement described above has the virtues of simplicity and energy conservation mentioned previously, but it can not operate at the high production rates necessary for economical production. For example, the parison must first be brought to orientation temperature throughout its entire thickness. If the metal surfaces of the core and injection mold cavity are maintained at temperatures at or slightly below the orientation temperature range of the thermoplastic to be processed, 190° F. to 200° F. for PET, the parison will eventually be cooled to an equilibrium temperature condition corresponding to the desired orientation temperature range, across its thickness, while it is still in the injection mold. However, the rate of cooling of the parison within the injection mold will be extremely slow because of the small temperature differential between the parison, the core, and the mold surfaces. Thus, the speed of operation of the apparatus will be limited by the long injection molding cycle required. In contrast, if the core and injection mold cavities are maintained at a much lower temperature, conventionally about 35° to 40° F. for PET, the rate of cooling will be increased substantially, but an uneven temperature distribution will be created across the thickness of the parison. Such rapid cooling of the parison, if accomplished within an economical and commercially feasible cycle time, will result in surface temperatures of the parison which are substantially below the orientation temperature range of the thermoplastic being processed and will actually approach the temperature of the core and the injection mold, while the middle or mid-point of the parison walls will be substantially above the desired orientation temperature range. Therefore, satisfactory orientation will not be achieved during the stretching and blowing of parisons which have such substantial mal-distributions of temperatures across their thickness, major portions of which lie outside the orientation temperature range of the thermoplastic being processed.

The cycle time limitations resulting from the slow parison or preform cooling inherent in Scalora's teaching are overcome to a certain degree in other subsequently disclosed art. For example, in U.S. Pat. Nos. 3,966,378 and 4,151,248, issued on June 29, 1976 and on Apr. 24, 1979 respectively, to Emery I. Valyi.

In U.S. Pat. No. 3,966,378, a parison is formed on a first core in an injection mold, cooled in the injection mold, transferred on said first core to a pre-blow mold and partially expanded against the inner surfaces of the pre-blow mold to a shape intermediate that of the parison and that of the finished article. Next, cooling is effected on the first core in the pre-blow mold to a uniform temperature across its thickness within the desired orientation temperature range of the thermoplastic being molded. The temperature conditioned parison is then transferred to a second blow core and later transferred to a third mold where it is axially stretched by said second core and finally radially stretched and expanded in the third mold, which is the final blow mold, to form a hollow biaxially oriented article. Separate parisons may be simultaneously injection molded, preblown, and cooled to orientation temperature, and finally stretch-blown, if multiple sets of cores and molds are utilized. Because the parison is not conditioned to a uniform orientation temperature across its thickness in the injection mold, the injection mold can operate at a reasonable and economical production rate. However, the necessity for additional preblow molds and additional cores and transfer means greatly complicates the apparatus and requires greater capital investment. Furthermore, pre-blowing to an intermediate shape is actually somewhat self defeating in that it sacrifices the amount of orientation which may be subsequently imparted to the parison, since the degree of orientation which may be imposed is directly proportional to the amount of stretch which takes place after the parison has been brought to the desired orientation temperature, which in this case takes place in the pre-blow mold. Obviously, the amount of orientation-stretching which can be accomplished from stretching the parison's intermediate shape to its final shape is less than if the parison was stretched, at orientation temperature, from its original shape to its final shape.

In U.S. Pat. No. 4,151,248, Valyi avoids the need for pre-blow molds with its attendant sacrifice in the levels of orientation which may be achieved, by claiming a method for preparing hollow oriented plastic articles wherein a parison is formed and cooled rapidly on a first core in an injection mold to an average temperature suited for orientation but having unequal distribution of temperature across the walls of said parison, being cold on the outer surfaces and hot in the middle. Next, the cooled parison on said first core is transferred to a tempering mold where it is stripped from said first core and deposited in the tempering mold. The cooled parison is then conditioned or tempered in the temperature controlled tempering mold to equalize the temperature distribution across the walls of the parison and attain a uniform temperature distribution corresponding to the desired orientation temperature of the thermoplastic material being molded. The tempering is aided by insertion of a separate stretch-blow core into and against the parison, to provide pressure contact between the parison and the tempering mold, thereby speeding heat transfer between the two. The temperature conditioned parison is then transferred on the stretch-blow core to a third mold, which is the stretch-blow mold, and is finally axially stretched by telescoping extension of said stretch-blow core, and then radially expanded and cooled in said stretch-blow mold, to form a biaxially oriented hollow article. Because the parison need not be conditioned to a uniform orientation temperature across its wall thickness in the injection mold, the parison may be removed from the injection mold early, and the injection molding step can be operated at a reasonable rate, and much faster than otherwise would be possible. However, the necessity for additional cores, molds, and transfer means greatly complicates the apparatus and substantially adds to the costs.

In U.S. Pat. No. 3,776,991, issued Dec. 4, 1973, Marcus teaches a method for producing biaxially oriented hollow plastic articles in a rotary type injection molding machine having a least four stations, wherein a parison is formed on a first core within an injection mold at the injection station, cooled in the injection mold to a temperature above the orientation temperature, indexed to an interim station on said first core where the parison is preblown against the cold surfaces of an interim mold, which is larger than the shape of the original parison but smaller than the shape of the final desired article, cooled in the interim mold to the optimum orientation temperature, indexed on said first core to a blow station and positioned within the final blow mold whose cavity is in the shape of the final desired article. The preblown parison is then axially stretched in the closed final blow mold by extension of a poppet valve stem located within said first core rod, and finally radially expanded outward to its final shape, against the cavity walls of the blow mold, and then cooled to a suitable ejection temperature. After opening the blow molds, the core rod and biaxially oriented article are indexed to an ejection station, where the biaxially oriented article is removed. This method dispenses with the need for additional cores taught by the Valyi patents, but still requires the use of a pre-blow, or interim mold and interim mold station, with their attendant complexities and high costs. In this method there is some sacrifice of the capability to impart high levels of orientation, because the article is stretched less in going from the interim shape to the final shape, as compared to the stretching possible in other techniques wherein the parison is stretched at orientation temperature from the original parison shape to the final article shape.

In U.S. Pat. No. 4,065,246, Marcus teaches another injection blow molding process employing at least three stations wherein the parison is formed on a core in an injection mold, cooled to the desired orientation temperature range while in the injection mold, transferred on the same core to the final blow mold and allowed to dwell therein to bring the parison to uniform orientation temperature while the outer tip of the parison is in contact with a temperature controlled stop, and the remainder of the parison, except for the inner surface of its tip, is expanded slightly off the core to aid in the removal of the first core from said parison, by momentarily introducing low pressure air inside the parison. Alternatively, Marcus teaches that lubricant may be used to aid in removal of the first core from the parison. Next, the first core is removed from the partially expanded parison, and a second core is inserted and extended outwardly therein to stretch the parison longitudinally and thereby axially orient the parison. High pressure air is then introduced within the axially stretched parison to expand it radially outward until it contacts the cool surfaces of the blow mold cavity where it assumes its final shape and is cooled to a suitale ejection temperature. The biaxially oriented article is then transferred on said second core to an ejection station where it is ejected from the apparatus. This process avoids the duplication of molds but requires the duplication of cores and transfer means, and extra stations, all of which add complexities and additional costs.

SUMMARY OF THE INVENTION

It is the object of the present invention to provide a method and apparatus for injection blow molding which are suitable for the production of hollow biaxially oriented plastic articles, but which avoid the speed limitations, orientation capability limitations, and complexities of the aforementioned methods and apparatus.

It is a further object of the present invention to provide an apparatus for production of biaxially oriented hollow plastic articles using an in-line, single stage, injection blow molding machine, which does not require duplication of molds or cores, and which therefore can be made smaller, simpler, and cheaper than competitive apparatus, but which is still capable of producing highly biaxially oriented, high quality articles at a rapid rate.

Yet another object of the present invention is to provide an injection blow molding apparatus which can be readily adapted to incorporate a great number of injection molds, blow molds, and cores, so that, if desired, a large number of biaxially oriented articles can be produced simultaneously.

A further object of the present invention is to provide an injection blow molding apparatus for the production of biaxially oriented hollow plastic articles in an in-line, single stage, injection blow molding machine, wherein the operations of injection molding and cooling on the one hand, and conditioning and stretch blow molding of parisons on the other hand, are all done simultaneously at a single station, at different positions within that station.

In accordance with the present invention, a method is provided for the preparation of hollow biaxially oriented articles from moldable and orientable plastic materials. Briefly, the invention involves (a) first forming a parison on a cooled core rod by injecting a hot thermoplastic material at a temperature above its melting point into a cavity formed by the core rod and the inner surfaces of a cooled parison injection mold, (b) cooling the parison rapidly while it is on the cooled core rod and within the cooled injection mold, by circulating low temperature coolant, which is usually around 35° F. to 40° F., through the core rod and the injection mold, so that the parison is cooled down to an average bulk plastic temperature across the thickness of the parison which lies within the orientation temperature range of the thermoplastic material being processed, and thereby inducing an unequal distribution of temperature across the walls of said parison, such that said parison has cool outer surfaces and hot middle portions within its walls, (c) removing the core rod with the parison thereon from the injection mold and laterally transferring the parison to a conditioning and stretch-blow molding position within the same station, where a cooled blow mold closes over the parison and core rod, (d) allowing the parison to remain within the blow mold sufficiently long so that the temperatures at points across the thickness of the parison equalize and become uniform, and the average bulk plastic temperature across the thickness of the parison remains at or near the preferred orientation temperature of the material being processed, (e) stretching the parison in an axial direction by advancing the entire core rod forward, axially into the blow mold, while retaining the neck portion of the parison in a fixed position, so that the parison is stretched to its final length, which it assumes upon contacting the cooled blow mold surface, and thus the parison is oriented in the longitudinal or axial direction, (f) radially expanding the parison outward into contact with the cooled blow mold surfaces by introducing compressed air into the parison, either simultaneously with or sequential to the axial stretching step, and thereby orienting the parison in the circumferential direction, so that the parison which has been oriented in the axial direction in step (e) and now has been oriented in the radial direction, yields a biaxially oriented final article, (g) finally, cooling the biaxially oriented hollow plastic article within the blow mold to a suitable ejection temperature, and then removing the article from the blow mold and core rod when the press of the injection blow molding machine opens.

Furthermore, in accordance with the present invention a method is provided in step (d) above which allows the temperature across the thickness of the parison to equalize at or near the preferred orientation temperature of the thermoplastic material being processed while both the inner and outer surfaces of the parison are in contact with air to allow equal thermal exposure on both surfaces. This is done by introducing compressed air between the parison walls and the core rod, through an aperture adjacent to the inner neck portion of the parison. The pressure of said compressed air is sufficient only to break the plastic to core rod interfacial seal. The compressed air may be circulated through the parison interior or a small metered amount may be introduced and then retained within the parison.

In addition, a method is provided in step (g) above to cool the finished article prior to ejection. This cooling may be done in a variety of ways as follows:

(1) allowing the finished article in the blow mold to cool solely by heat transfer to the cold blow mold surfaces,
(2) continuously circulating compressed air through the interior of the finished article while cooling the exterior by heat transfer to the cold blow mold surfaces,
(3) continuously circulating prechilled gas through the interior of the finished article while cooling the exterior by heat transfer to the cold mold surfaces,
(4) mixing a water mist with the prechilled gas and continuously circulating the mixture through the interior of the finished article while cooling the exterior by heat transfer to the cold blow mold surfaces. The ultimate speed of final part cooling and final desired ejection temperature are criteria for selecting the preferred method from the above-mentioned alternatives.

The apparatus of the present invention includes at least one injection mold and at least two blow molds, each such mold defining an injection mold and blow mold cavity, respectively, including neck form means for defining the neck extension of the injection and blow mold cavities, at least two core assemblies and injection means for forming parisons within the injection mold, core rod cooling means for cooling the inner surface of the parison, injection and blow mold cooling means for cooling the exterior of the parison and finished article, respectively, support and transfer means which allow parisons to be formed and cooled in the injection molds simultaneously with the equilibration, stretching, and blowing operations which take place in the blow molds, equilibration means which also include preblowing means for temperature conditioning of the parisons, core rod retractor and core rod advance means, final blowing and final article cooling means.

The exact physical attributes and mechanical composition of the present invention are described in detail with reference to the accompanying drawings. A detailed description of the operation of the apparatus in the present invention is also provided in the following sections.

DETAILED DESCRIPTION OF THE PREFERRED EMBODIMENTS

Figure 1:
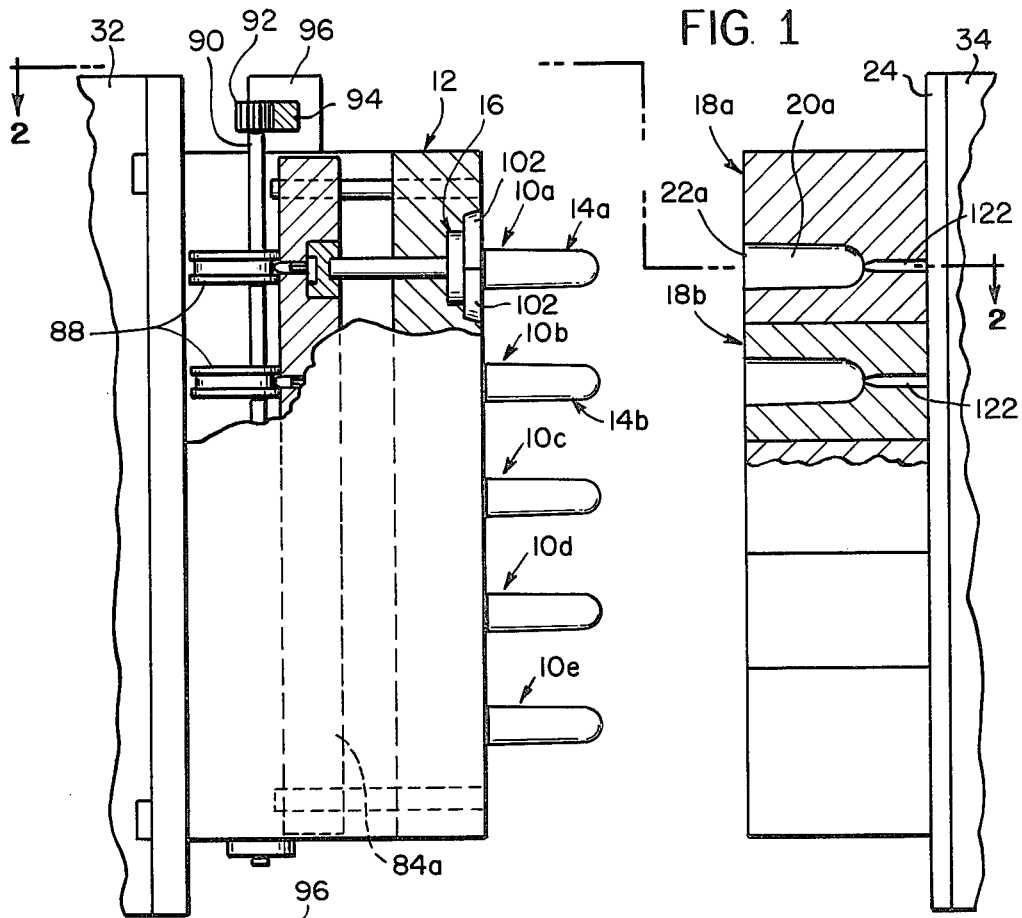
FIG. 1 is a fragmentary, partially sectional, elevational view of an apparatus in accordance with an embodiment of the present invention.
Figure 2:
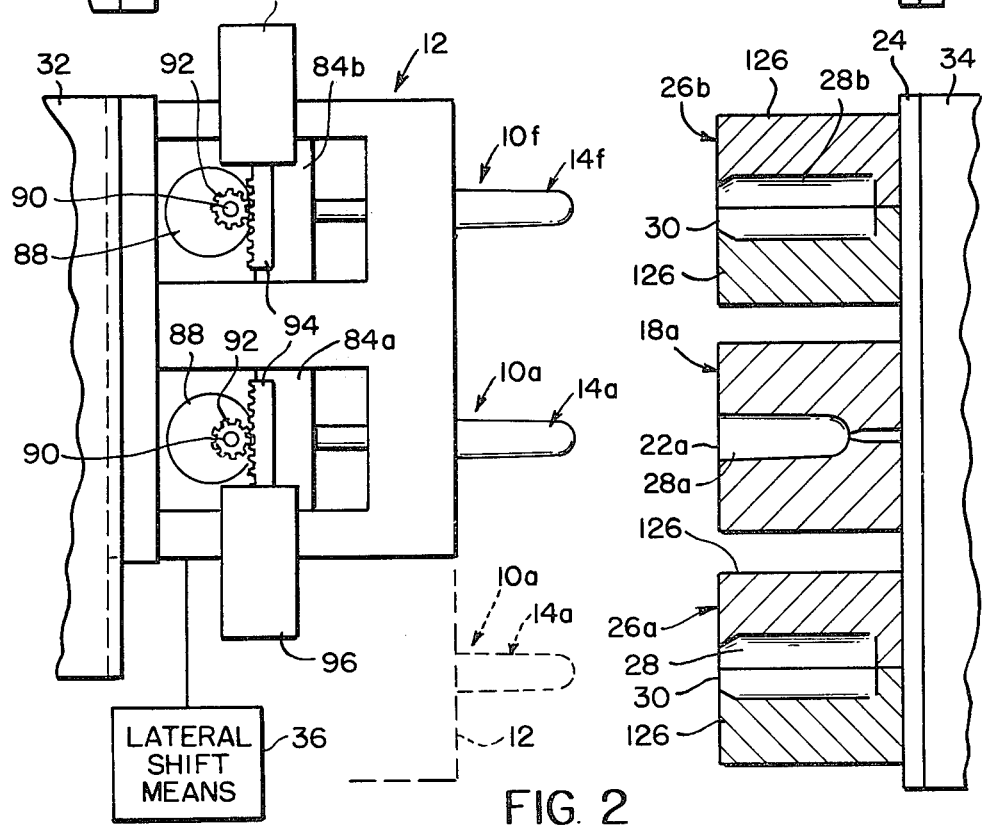
FIG. 2 is a view taken along line 2—2 in FIG. 1.

As shown in FIGS. 1 and 2, the apparatus of a preferred embodiment of the present invention includes ten assemblies 10, which are mounted on a core plate 12 in two vertical rows of five assemblies each. Each core assembly 10 includes a core rod 14 and a sleeve 16. The sleeve 16 of each core assembly 10 is fixedly mounted to the core plate 12. The core rod 14 of each core assembly 10 is slidably received in the sleeve 16 of that assembly so that each core rod 14 protrudes from the core plate 12.

Five injection molds 18 are included, which define respective preform cavities 20, each of which, in turn has an open mouth 22, and are mounted to a mold plate 24 so that their cavity mouths 22 face toward the core plate 12. The injection molds 18 are mounted in a vertical row between adjacent vertical rows of blow molds 26. There are five injection molds 18 per vertical row. In FIG. 1, the vertical distance between the centerlines of the cavity mouths 22 in injection mold 18a and 18b is equal to the vertical distance between the centerlines of core rods 14a and 14b. The vertical distance between centerlines is the same between each injection mold 18 and each core rod 14 in their respective vertical rows.

Ten blow molds 26 are included, although only two of these are visible in FIG. 2. Each of these blow molds defines a blow mold cavity 28 having an open mouth 30. The blow molds are mounted to the mold plate 24 in two vertical rows of five blow molds per row. The vertical distances between adjacent blow molds, measured between the centerlines of the cavity mouths 30, are equal to the vertical distances, measured between the core rod 14 centerlines, between adjacent core rods in a common vertical row of core assemblies 10. The vertical rows of blow molds are alternately mounted on the mold plate 24 with the vertical rows of injection molds 18. The horizontal spacing between adjacent vertical rows of molds, measured between the centerlines of adjacent mold cavities, is equal to the horizontal spacing between adjacent vertical rows of core assemblies, measured between the centerlines of horizontally adjacent core rods 14.

The core plate 12 is slidably mounted to one platen 32 of a press, and the mold plate 24 is fixedly mounted to the opposing platen 34 of the press. The press is arranged to move the platens 32 and 34 towards and away from one another, and thereby move the core plate and mold plate towards and away from one another. Any type of press may be utilized, but the hydraulic and toggle types of presses commonly used in the injection molding art are preferred.

As shown in solid lines in FIG. 2, the core plate 12 is in its first lateral position, so that a first vertical row of core assemblies, which includes core assembly 10a, is aligned with the vertical row of injection molds which includes injection mold 18a, and the second vertical row of core assemblies, which includes core assembly 10f, is aligned with the vertical row of blow molds which includes blow mold 26b. Thus, when the press moves the core plate 12 towards the mold plate 24, core rod 14a of core assembly 10a will enter into the cavity 20a of injection mold 18a, core rod 14b will enter into the cavity of injection mold 18b, and the core rods 14 of the other assemblies in that vertical row will enter into the cavities of the other injection molds. At the same time, core rod 14f of core assembly 10f will enter into the cavity 28b of blow mold 26b, and the core rods of the core assemblies which are in the same vertical row as core assembly 10f will enter into the cavities of the corresponding blow molds.

In FIG. 2 the lateral shift means 36 is operatively associated with the core plate 12 to shift the core plate 12 laterally of the press and mold plate 24, into a second lateral position indicated in broken lines in FIG. 2 while the press is open and the core rods are remote from the injection and blow molds. The lateral distance traversed by the core plate in the course of each such shift is equal to the horizontal spacing between adjacent vertical rows of core assemblies, measured between the centerlines of horizontally adjacent core rods. Thus, when the core plate is in the second lateral position, the first vertical row of core assemblies, including core assembly 10a, will be aligned with the vertical row of blow molds which includes blow mold 26a, and the second row of core assemblies, which includes core assembly 10f, will be aligned with the row of injection molds, including injection mold 18a.

The lateral shift means 36 is synchronized with the press, and is arranged to move the core plate 12 each time the press opens. Thus, the core plate 12 will be in its second lateral position during the intervening press cycles. Thus, the core plate 12, mold plate 24, press, lateral shift means 36, which together constitute the support and transport means of the preferred embodiment, will engage each core assembly 10 alternatively with one of the injection molds 18 with one of the blow molds 26. The lateral shift means 36 may include a pneumatic or hydraulic cylinder and appropriate control valves (not shown).

As set forth above, each one of the core rod assemblies 10 includes a sleeve 16 which is fixedly mounted to the core plate 12 and a core rod 14 which is slidably received in the sleeve 16. As shown in detail in FIG. 3, each core rod 14 has a circumferentially extending conical seal surface 38, and each sleeve 16 has a matching circumferentially extensive conical seal surface 40. Each core rod 14 includes a parison contact portion 42 which extends outwardly from the seal surface 38 of the core rod to the apex and tip of the rod where a tip opening 70 is formed which acts as a seat for air plug 76. Each core rod includes an actuator portion 46 extending inwardly, through the bore 48 of the associated sleeve 16 to the core rod control plate 84.

Figure 6:
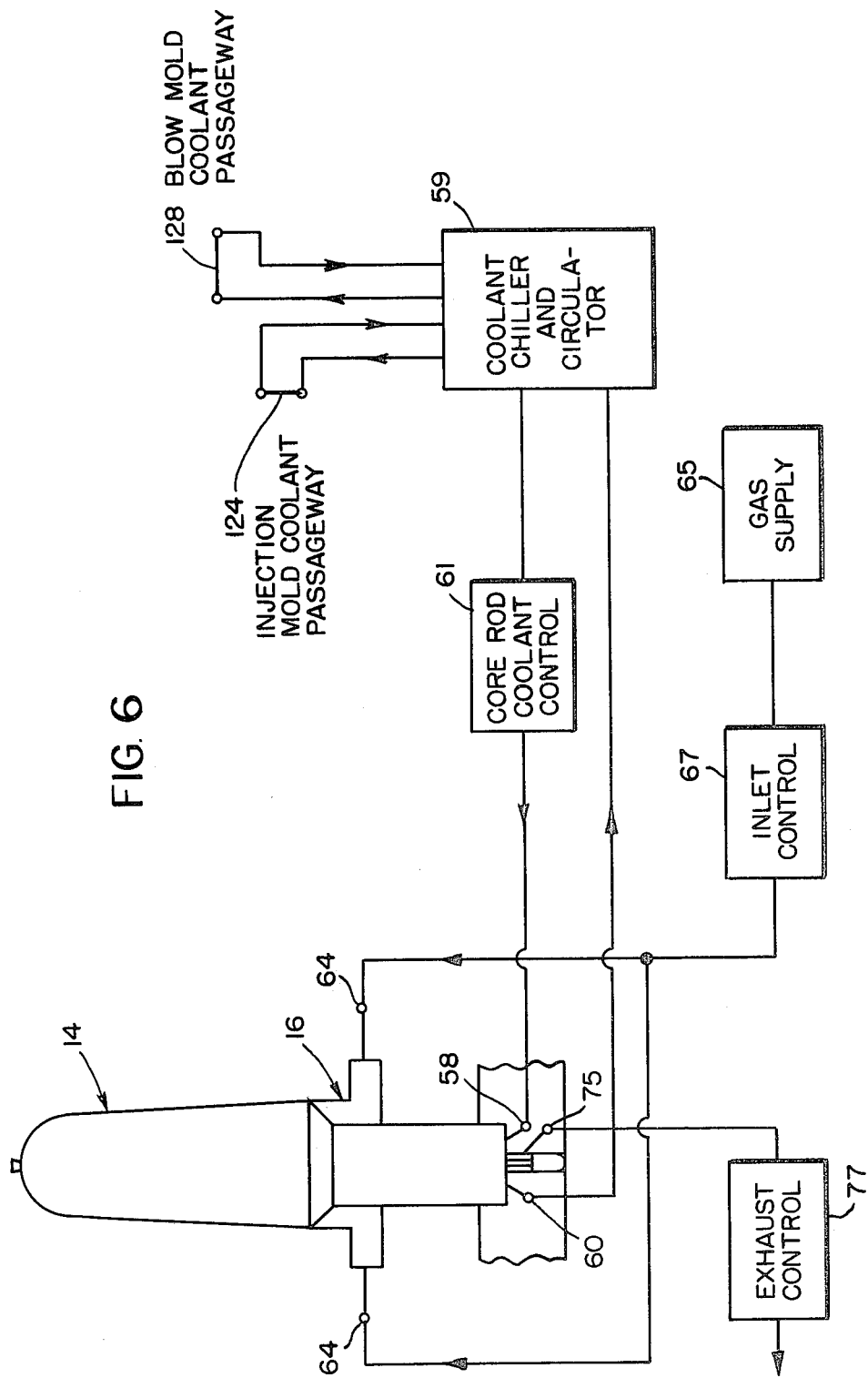
FIG. 6 is a schematic view depicting the fluid circuitry associated with one core rod assembly, one injection mold and one blow mold.

Each core rod interior is formed from a cylindrical cooling bore 50 extending coaxially with the core rod 14. A cylindrical flow director slug 52 having interlaced helical grooves on its surface is positioned within the cooling bore 50 so that a slug 52 and the wall of the cooling bore 50 cooperatively define a pair of interlaced helical channels 54 and 56 which do not communicate with one another along the length of the slug 52. The slug 52 and the cylindrical cooling bore 50 wall of the core rod 14 cooperatively define a circular cross passage 57 which interconnects the helical channels 54 and 56 at the parison contact tip of the cooling bore. One of the channels is connected to a cooling fluid inlet passageway 58, and the other one of the helical channels is connected to a cooling fluid outlet passageway 60. As shown in FIG. 6, coolant is supplied via chiller and circulator 59 through a core rod coolant control valve 61 to the cooling fluid inlet passageway 58. The coolant is conducted up the core rod 14 through one of the helical channels 54, and then across passage 57 and back down the core rod through the other channel 56, to the cooling fluid outlet passageway 60. The coolant is then recycled back to the coolant chiller and circulator 59. The interlaced pattern of these channels assures that the cooling fluid will exert a uniform cooling effect throughout the entire length of the parison contact portion 42 of the core rod 14.

Figures 3, 3A:
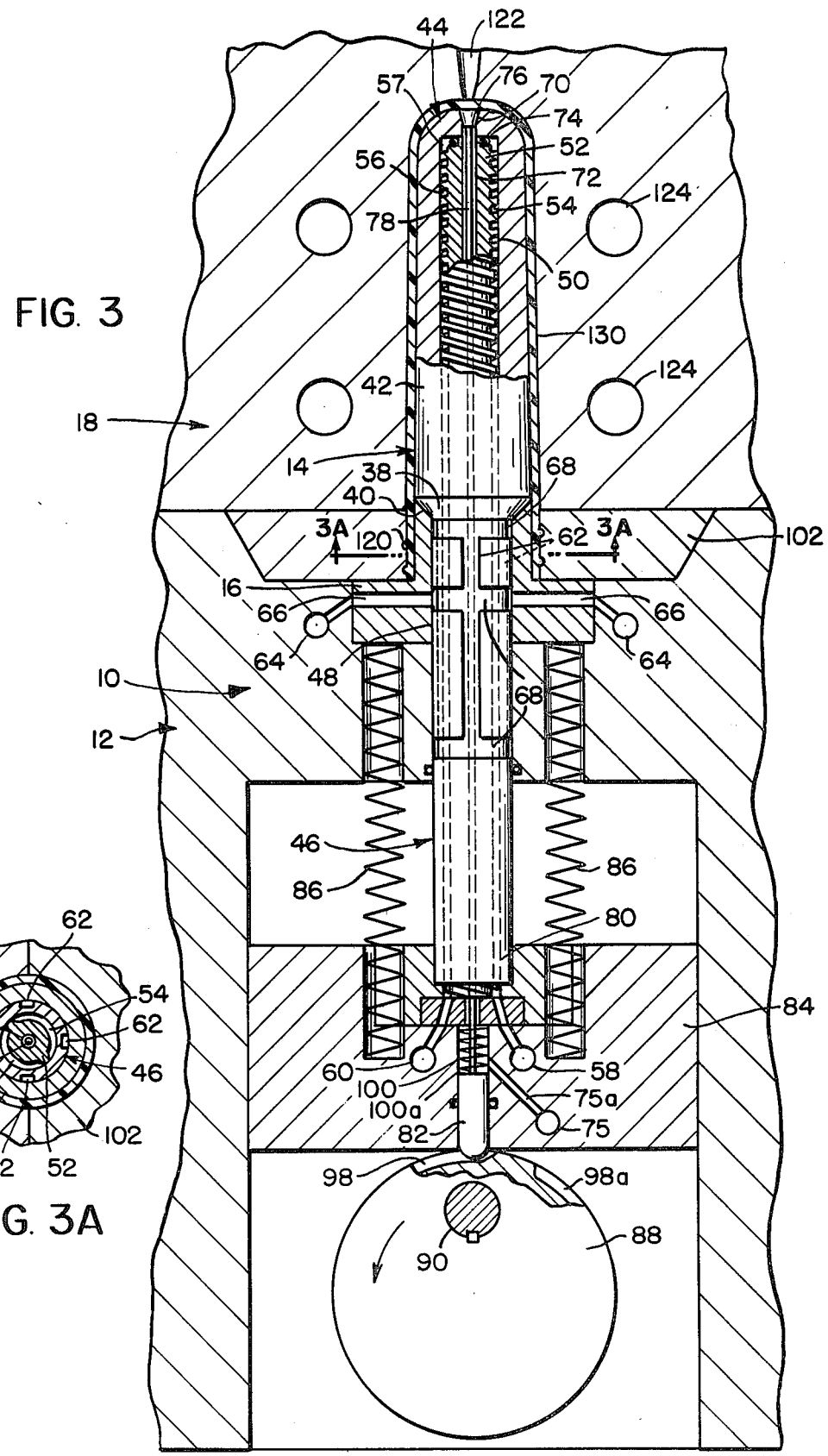
FIG. 3 is a fragmentary sectional view of the apparatus depicted in FIGS. 1 and 2, showing one of the core assemblies in engagement with one of the injection molds.
FIG. 3A is a view taken along line 3A—3A in FIG. 3.

As best seen in FIG. 3A, the actuator portion 46 of each core rod, which extends through the bore 48 of the associated sleeve 16, has many grooves 62 which extend axially along its outer surface to the seal surface 38 of the core rod. The grooves 62 are in communication with blow gas inlet conduits 64 by way of cross passageways 66 formed in the sleeve 16 and core plate 12. The inlet conduits 64 in FIG. 6 are connected to a gas supply 65 by way of a gas inlet control 67. Several circumferential grooves 68 in FIG. 3 on the surface of the actuator portion of the core rod 46 interconnect the axial grooves 62 to promote even gas distribution among the axial grooves 62 and serve to connect such axial grooves 62 with the cross passageways 66 of the sleeve 16 and core plate 12. Thus, the axial and circumferential grooves are part of a passageway means for conducting blowing gas from the gas supply to the juncture between the seal surface 38 of the core rod and the seal surface of the sleeve.

A tip opening 70 is at the parison contact end of each core rod. An exhaust passageway 72 extends through the length of the core rod from the tip opening 70 down to the spring chamber 100a, through vent passageway 75a and vent bore 75, which are formed in the core rod control plate 84, and to atmosphere via exhaust control 77 in FIG. 6. The exhaust passageway is isolated from the chiller coolant cross passage 57 in FIG. 3 at the tip of the parison contact end of the cooling bore 50 in the core rod by an O-ring 74. An air plug 76 is affixed to a stem 73, which extends through the entire length of the core rod in the exhaust passageway 72, and ends in an enlarged head 82.

The actuator end 80 of each core rod is affixed to an associated core rod control plate 84, which in turn is slidably mounted within the core plate 12 for advancing the core rods in an outward direction towards the mold plate 24. Each such control plate 84 is biased away from the sleeve 16 in FIG. 3 by compression springs 86 which bear upon the sleeve 16 and on the core rod control plate 84. Preferably, the core rods of each vertical row of core assemblies are affixed to a common core rod control plate 84. Thus, as shown in FIG. 1, all of the core rods 14a through 14e of the core assemblies 10a through 10e of the first vertical row of core assemblies are affixed to a first core rod control plate 84a, while the core rods of the second vertical row of core assemblies are affixed to a separate core rod control plate 84b in FIG. 2.

Thus, the springs 86 and the core rod control plates 84a and 84b will serve as core rod retractor means, and will retain each core rod in its fully retracted position except when the associated core rod control plate 84 is forced toward the mold plate 24 in FIG. 2 by the cams 88 associated with such core rod control plate. Those cams are fixedly mounted on shafts 90 which are rotatably mounted to the core plate by bearings (not shown) and which are connected to pinions 92 in FIGS. 1 and 2. The pinions 92 are each connected by racks 94 to respective pneumatic cylinders 96. Thus, the pneumatic cylinder 96 can operate the cams 88 associated with each core rod control plate 84 and force that core rod control plate 94, and the core rods associated therewith, towards the mold plate 24. Each of the cams 88 has a series of slots 98 formed on its periphery. Each one of these slots is arranged to receive the head 82 of the stem 78 in FIG. 3 of the associated core rod assembly.

A spring 100 bears on each stem head 82 to urge it into the slots 98 of the associated cam 88. When one of the cams 88 is in a position such as that depicted in FIG. 3, wherein the slot 98 is aligned with the associated stem head 82, then the air plug 76 of the associated core rod assembly will be in its closed position. When the cam 88 is rotated to a position such as that depicted in FIG. 4, wherein no slot is aligned with the stem head 82, then the associated air plug 76 will be moved to its open position. In this manner the cams serve as part of the means for opening and closing the air plug 76.

Pairs of neck ring halves 102 are mounted to the core plate 12 so that each pair of neck ring halves 102 surrounds the sleeve 16 of an associated core rod assembly. Each pair of neck ring halves is movably mounted to the core plate 12 by conventional neck ring actuating means (not shown) so that the neck ring halves 102 may be moved outwardly away from each other, and outwardly from the core plate 12 when the core plate is moved away from the molds by the press. However, when the core plate 12 is advanced toward the molds and the core rods 14 are engaged with the molds as in FIG. 4, a surface 104 of each neck ring half cooperates with a surface 106 on the core plate 12 to force by means of wedging action that neck ring half against the mating neck ring half and sealingly engage each pair of neck ring halves with one another along a parting line between them. Also, whenever the core plate 12 is advanced toward the molds and the core rod assemblies are engaged with the molds, the mold-facing surface 108 of each neck ring half sealingly engages a parting line surface 110 of the adjacent mold. Simultaneously, a sleeve facing surface 112 of each neck ring half engages a mating surface 114 of the associated sleeve. In this faxhion the neck ring halves serve to seal the sleeve of each core rod assembly within the core plate 12 and away from the mold with which such core rod assembly is engaged.

Figure 4:
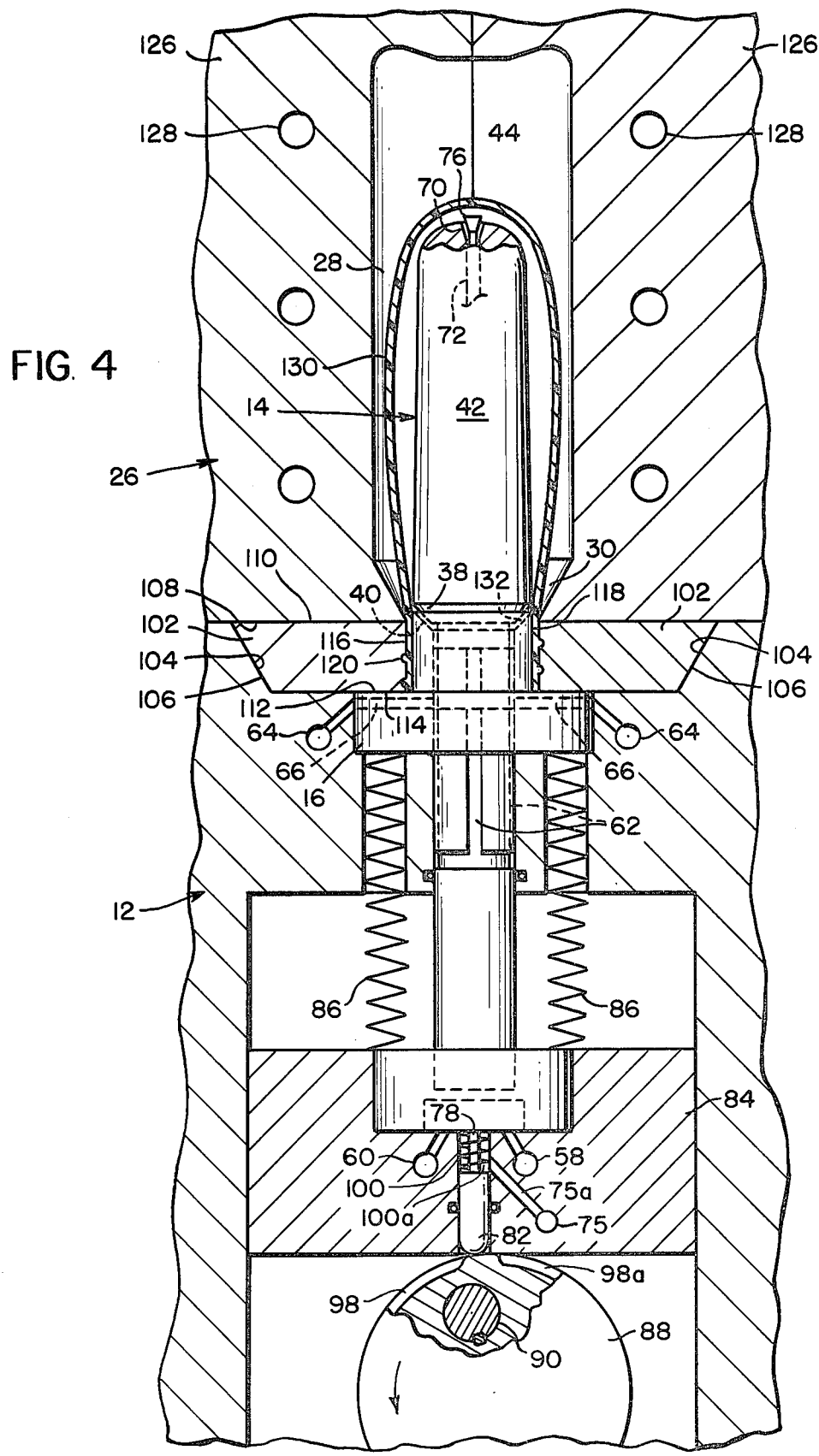
FIG. 4 is a view similar to FIG. 3 depicting the same core assembly, but showing such core assembly in engagement with a blow mold.

Each of the neck ring halves 102 in FIG. 4 includes a hemicylindrical surface 116. When the neck ring halves are engaged with one another, and the associated core rod assembly is engaged with one of the mold cavities, these surfaces 116 define a space 118 surrounding the outer portion of the sleeve 16. Each such space forms a neck extension of the adjacent mold cavity.

Although the cooperation of the neck ring halves with the molds and the sleeves of the core rod assemblies has been described above with reference to the blow molds, the neck ring halves function in the same fashion with the injection molds as shown in FIG. 3. Thus, the neck rings define a neck extension of the cavity of each mold, regardless of whether the core rod assembly is engaged with an injection mold or a blow mold. The hemicylindrical surface 116 of each neck ring half is provided with grooves 120. These grooves are arranged so that, when a pair of neck ring halves are engaged with one another the grooves 120 cooperatively define a continuous helical channel or thread along the surface 116 of such neck ring halves.

Each injection mold 18 in FIGS. 1, 2 and 3 is provided with a sprue 122 which communicates with the cavity 20 of the mold. These sprues are in communication with an injection barrel and screw assembly (not shown) by way of a conventional runner system (not shown). The thermoplastic to be processed can be brought to a molten state within the injection barrel and forced under pressure through the runner system to the sprues 122. Thus, the sprues 122 serve as part of a system for injecting molten thermoplastic into the injection molds. Also, each of the injection molds is provided with coolant passages 124 in FIG. 3. These coolant passages are connected to the coolant chiller and circulator 59 in FIG. 6 so that the circulator can force coolant through the passageways and maintain the mold at the desired temperature.

Figure 5:
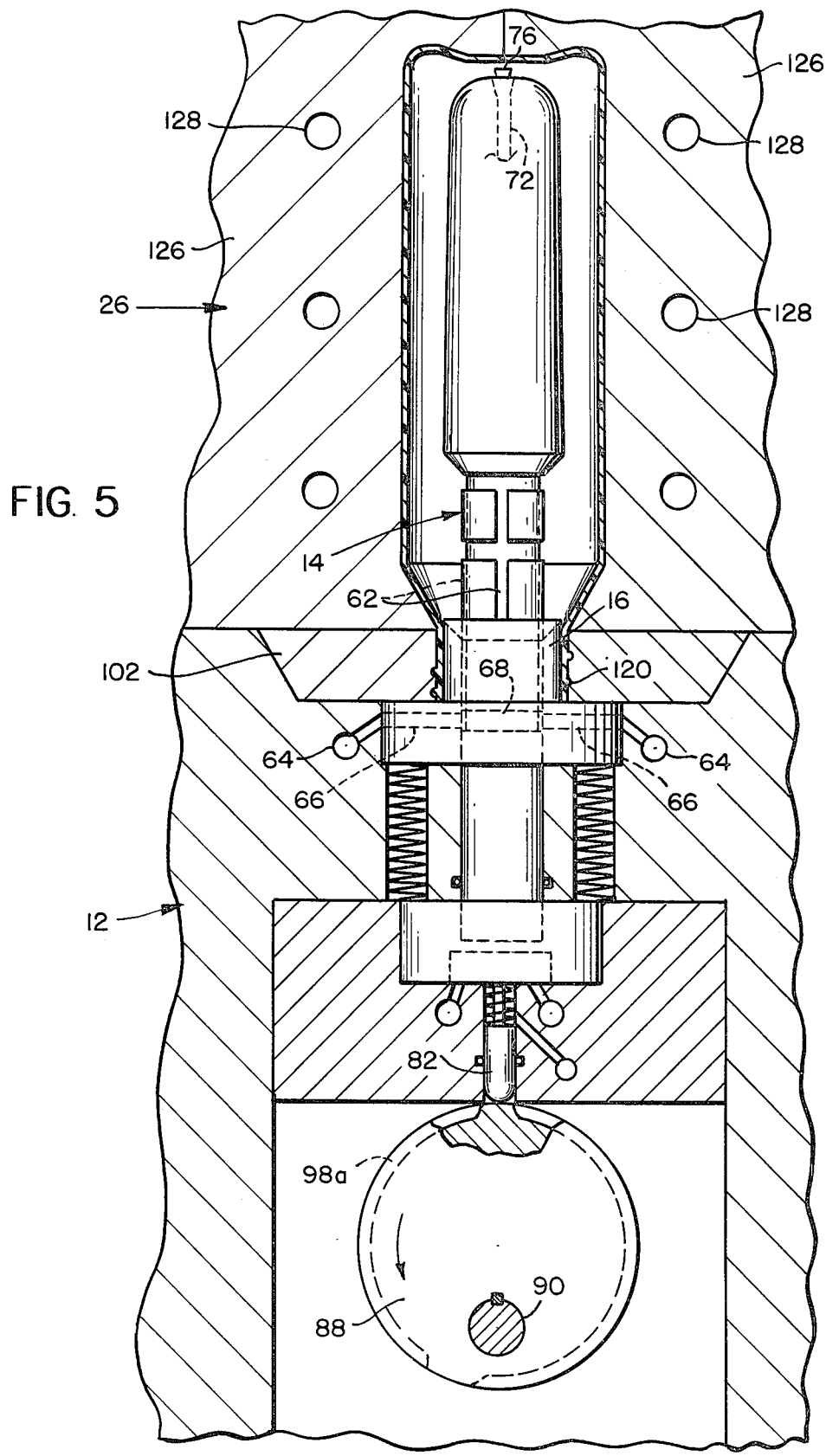
FIG. 5 is a view similar to FIG. 4, depicting the same core assembly and blow mold, at a later time during the sequence of operation of the apparatus.

Each of the blow molds 26 in FIGS. 2, 4 and 5 includes a pair of separable mold halves 126 which are slidably mounted to the mold plate in FIG. 2. Conventional blow mold opening and closing apparatus (not shown) is provided for moving the blow mold halves 126 by wedging action into sealing engagement with one another and maintaining them in such engagement while the press is closed and the core assemblies are engaged with the molds. The blow mold opening and closing appratus is also arranged to separate the halves of each blow mold 126 from one another at the appropriate time to allow the article formed in the blow mold cavity 28 in FIG. 2 to be extracted from the apparatus. Each of the blow mold halves 126 has coolant channels 128 in FIGS. 4 and 5 formed in it. These channels are connected to the coolant chiller and circulator 59 in FIG. 6 so that the circulator can force coolant through the channels 128 to maintain the mold halves at the desired temperature.

Operation of the Preferred Embodiments

The operation of the apparatus will now be described with reference to a single one of the core assemblies. The molding cycle begins when the press brings the platens 32 and 34 in FIG. 1 to the closed position thus engaging the core assembly with an injection mold as shown in FIG. 3. The core rod 14 is held in its fully retracted position by the springs 86 and control plate 84, so that the seal surface 38 of the core rod is sealingly engaged with the seal surface 40 of the associated sleeve 16. The neck ring halves 102 are engaged with one another, and form the neck extension of the mold cavity, which is a concentric space around the sleeve 16.

While the apparatus is in this position, the thermoplastic to be processed by the apparatus is injected into the cavity of the injection mold, via the conventional runner system and sprues 122, in a molten condition under substantial pressure. The thermoplastic thus injected will also flow into the neck extension of the cavity which is defined by the neck ring halves 102 and the sleeve 16.

The parts of the apparatus are maintained in this position after injection while the injected thermoplastic is cooled by heat transfer to the parison contact portion 42 of the core rod, the sleeve 16, the neck ring halves 102, and the mold 18. During this cooling step of the process, the surface of the parison contact portion of the core rod and the caivty surface of the mold are maintained at low temperatures relative to the thermoplastic material being processed by the coolant chiller and circulator 59 in FIG. 6, which circulates chilled coolant, conventionally at or near 35° F., through the helical coolant passageways 54 and 56 in the core rod and through the coolant passageways 124 in the injection mold 18.

In the cooling step described above, the parison is held within the injection mold until the average bulk plastic temperature of the parison is at or very near the preferred orientation temperature of the thermoplastic material being processed. At this time, the center portions of the parison walls, remote from the cold core rod and mold cavity surfaces, will be at temperatures above the orientation temperature of the material being processed, while the surface of the parison walls will be below the preferred orientation temperature.

As a result of this temperature gradient across the thickness of the parison, it is impossible to molecularly orient the article being formed in a uniform manner. A thermal equilibration step is necessary so that the temperature profile across the thickness of the parison will be uniform prior to the final stretching and blowing steps, and so that the resultant molecular orientation in the final blown article will be uniform across the thickness of the final blown article. The thermal equilibration step is carried out in the blow molds.

In order to transfer the parison to the blow mold, the press moves platens 32 and 34 in FIG. 1 away from each other, carrying core plate 12 away from the mold plate 24 and disengaging the core assembly from the injection mold 18. The parison is retained on the same core assembly by frictional engagement of the parison with the parison contact portion 42 of the core rod and with the sleeve 16. Such frictional engagement is quite strong, because the parison has undergone shrinkage during the cooling described above. The retention of the parison on the core assembly is further assured by the engagement of the grooves 120 on the neck ring halves 102 with the thread on the neck portion of the parison.

The lateral shift means 36 in FIG. 2 then slides the core plate laterally of the mold plate to align the core rod and parison with one of the blow molds 26. The press then closes the platens 32 and 34 in FIG. 1 and advances the core plate 12 towards the mold plate 24 so that the core assembly and parison are carried into engagement with the blow mold 26, and the thermal equilibration of the parison begins. During such engagement the major portion of the parison 130 may be blown slightly away from the parison contact surface of the core rod, as shown in FIG. 4. This is known as preblowing the parison.

To perform the preblowing step, the cam 88 in FIG. 4 associated with the core assembly is rotated by the associated pneumatic cylinder 96, rack 94, pinion 92, and shaft 90 in FIG. 2 to the position depicted in FIG. 4. This forces the core plate 84 toward the blow mold 26 against the resistance of the core rod return springs 86. By this action, the core rod 14 is advanced into a so-called intermediate position, wherein the seal surface 38 of the core rod is spaced slightly from the seal surface 40 of the sleeve 16. The rotation of the cam 88 to the position shown in FIG. 4 also moves the slots 98 in the cam out of alignment with the head 82 of stem 78, so that the head 82 is moved toward the mold 26, and the plug 76 is moved into its open position.

Subsequently, gas under pressure flows from the gas supply 65 in FIG. 6 through the inlet control 67, the blow gas inlet conduits 64, cross passageways 66, and the circumferential 68 and axial 62 grooves in the core rod to the space between the seal surface 38 of the core rod and the seal surface 40 of the sleeve. The gas is introduced between the major portion of the parison 130 and the parison contact portion 42 of the core rod at the juncture between the major portion of the parison and the neck portion 132 of the parison. The gas so supplied flows between the core rod and parison to the parison contact tip 44 of the core rod and enters the opening 70. The gas then passes through the exhaust passageway 72 of the core rod, through the spring chamber 100a, through the vent passageway 75a, to the vent bore 75, and through the exhaust control 77 in FIG. 6 into the atmosphere.

The inlet control 67 and the exhaust control 77 in FIG. 6 regulate the flow of gas into the parison so that the gas pressure within the parison is sufficient to expand the major portion of the parison away from the core rod but insufficient to expand the major portion of the parison into contact with the blow mold. Thus, while such gas pressure is maintained, the major portion 130 of the parison is not in contact with any surface, as shown in FIG. 4. As a result of preblowing, there is relatively little heat transfer from the walls of the parison to the surroundings. However, there is substantial heat transfer within the walls of the major portion of the parison. The central core of such walls, which are hotter than the surface portions when the parison was removed from the injection mold, will lose heat to the surface portions. In this fashion, the walls of the major portion of the parison 130 in FIG. 4 will be brought to a state of thermal equilibrium, in which they are of uniform temperature throughout their thickness. The absolute value of the average bulk plastic temperature of the parison remains at or near the preferred orientation temperature of the material being processed, the same as it was when the parison was removed from the injection mold, however, the individual temperatures of points across the thickness of the parison have become uniform at the orientation temperature.

The inner surface of the major portion 130 in FIG. 4 of the parison is continually swept by air flowing towards the core rod tip opening 70 during the equilibration step described above, while the outer surfaces of the major portion of the parison are in contact with still air. Therefore, any heat transfer from the major portion of the parison to its surroundings during the thermal equilibration step will occur primarily at the inner surface of the parison. Since the inner surface of the parison is normally slightly warmer than the outer surface at the time the parison is removed from the injection mold, the greater rate of heat transfer from the inner surface aids in equalizing the temperatures within the walls of the parison. The rate of heat transfer described above is controlled by regulating the flow of gas through the parison at exhaust control 77 in FIG. 6, and by controlling the temperature of the incoming gas.

Once the thermal equilibration of the temperatures across the thickness of the parison has been achieved as described above, the major portion of the parison 130 is stretched axially by rotating the cam 88 counterclockwise from the position shown in FIG. 4. Such rotation causes the core plate 84 to advance toward the blow mold 26, and thereby causes the core rod 14 to advance into the cavity 28 of the blow mold. The rotation of cam 88 also brings the slot 98a into alignment with the stem head 82. Thus, the stem head 82 drops into the slot 98a under the influence of spring 100, and the air plug 76 is restored to its closed position as the core rod begins to advance.

As the core rod is advanced in this manner to its fully extended position, the major portion 130 of the parison is stretched axially. During this axial stretching, the neck portion of the parison is retained by its engagement with the sleeve 16 and the grooves 120 of the neck ring halves 102 in FIG. 4. Simultaneously with or sequential to the commencement of axial stretching, the inlet control means 67 in FIG. 6 allows gas at a high pressure to enter the interior of the parison through the blow gas inlet conduits 64, the cross passageways 66, and the grooves 68 and 62 on the actuator portion of the core rod. The gas expands the parison outward into intimate contact with the cavity surfaces of the blow mold, so that the parison is formed into the configuration of the finished article in FIG. 5. Such expansion causes the walls of the parison to stretch in the circumferential or hoop direction.

Since the temperatures across the thickness of the parison walls are uniformly within the orientation range of the polymer being processed during the axial stretching and radial stretching blowing step, uniform biaxial molecular orientation is imparted to the major portion of the parison as it is formed into its final shape.

After the parison has been blown to its final desired shape, and the parison has been rigidized by external contact with the cold surfaces of the blow mold cavities, the cooling of the final blown article is further enhanced by continuously streaming gas through the interior of the article. This is accomplished by rotating cam 88 in FIG. 5 so that the slot 98a is moved out of alignment with the stem head 82 and the air plug 76 is moved into the open position The inlet control 67 and exhaust control 77 in FIG. 6 are actuated to direct a stream of gas into the interior of the article by means of the inlet conduits 64, cross passageways 66, and grooves 68 and 62 in FIG. 5, and exhaust by means of the tip opening 70, exhaust passageway 72, spring chamber 100a, vent passageway 75a, and the vent bore 75. This flowing gas cools the interior surface of the formed article. At the same time, the exterior surface of the article continues to be cooled by contact with the cold cavity surface of the blow mold 26.

After the formed article has been cooled to a suitable ejection temperature the mold platens 32 and 34 (in FIG. 1) open, the blow mold halves are separated from one another by conventional means, and the core plate 12 in FIG. 2 is retracted away from the mold plate 24. The sleeve 16 and the neck ring halves 102 in FIG. 5 grip the neck portion of the formed article, so that the formed article is retracted out of the blow mold as the core plate is retracted. The neck ring halves are then separated from one another by conventional means and the formed article is blown off the core rod by actuating the gas inlet control 67 in FIG. 6 to deliver a blast of compressed gas through the blow gas inlet conduits 64 the cross passageways 66, and the grooves 68 and 62 in FIG. 5. The finished article falls freely out of the apparatus into conventional conveying and receiving mechanisms for further processing.

To repeat the cycle, the cam 88 is rotated back to its initial position, so that the springs 86 may force the core rod 14 back to its fully retracted position and the spring 100 may force the air plug 76 back to its closed position. The lateral shift means 36 in FIG. 2 moves the core plate 12 laterally of the mold plate 24, back to its original position so that the core assembly is realigned with an injection mold, and the press closes to re-engage the core rod assembly with an injection mold.

Although the operation of the apparatus has been described with reference to a single one of the core assemblies, it should be clearly understood that the apparatus of the present invention utilizes a plurality of core assemblies, and that the support and transport means is arranged so that at least one of the core assemblies is engaged with an injection mold, while at least one other core assembly is engaged with a blow mold. Therefore, while some of the core assemblies are occupied with the injection molding and cooling steps, others of the core assemblies are occupied with the equilibration, stretching and blowing steps.

The number of cores per vertical row in the laterally shifting arrangement described above can be as small as one and as great as can be accomodated in the available platen 32 in FIG. 1. Likewise the number of vertical rows of cores and molds may be varied. At least two vertical rows of cores must be provided, but there can be as many vertical rows as can fit in the available platens. The number of vertical rows of injection and blow molds should be one greater than the number of vertical rows of core assemblies, the extra row being a vertical row of blow molds and the vertical rows of injection molds should alternate with the vertical rows of blow molds, beginning and ending with a vertical row of blow molds.

The first embodiment described above includes pairs of separable neck ring halves 102 in FIG. 3 which define a neck extension of the mold cavity during the engagement of a core assembly with a mold. However, alternative neck form means may be used to accomplish the same functions. For example, if split injection molds are used the neck form means may consist of portions of the molds which extend into the area previously occupied by the neck ring halves 102. These would directly engage the sleeve of the core assembly upon engagement of the core assembly with the mold. Such inwardly projecting portions of the split injection molds and the normally split blow molds could also have grooves formed in the parison contact surfaces, and serve an identical function as the neck ring halves described in the preferred embodiment, to retain the neck portion of the associated parison during the preblowing, equilibration, stretching, and final blowing steps, and also to form a thread on the neck of the parison.

It should be obvious that the operation of the above embodiment may be modified by eliminating the continuous circulation of gas through the parison interior during preblowing. This retention of the blowing gas within the parison during preblowing is achieved simply by closing exhaust control 77 in FIG. 6 at the appropriate time, or by designing the slot 98a in cam 88 such that the air plug 76 will remain closed. The purpose of such a modification would be to limit the amount of heat transfer from the inner walls of the parison during preblowing and thermal equilibration.

In addition, the above embodiment may be modified by totally eliminating the preblowing step, which occurs in the blow molds during thermal equilibration of the parison. This is done by keeping the gas supply inlet control 67 in FIG. 6 closed during the equilibration step, and by modifying the slot 98a in FIG. 4 in cam 88 such that the slot is in alignment with the stem head 82, and the air plug 76 remains in a closed position during equilibration. Thus, the parison will remain in intimate contact with the core rod surface during the thermal equilibration step.

Elimination of the preblowing step might be advantageous in the case where small core rods are used in making small sized containers. The amount of heat which could be extracted from the inner surface of the parison, by the coolant circulating through such a small core rod, might be insignificant in terms of adversely affecting the thermal equilibration of the parison.

Therefore, preblowing the parison slightly off of the core rod would not improve the conditions which allow the temperature profile across the thickness of the parison to equlibrate.

Many additional modifications of the above embodiments are possible and should be obvious to those skilled in the art. Since the finished article is cooled by continuous circulation of air through its interior in one of the above embodiments, the gas supply and inlet control means 65 and 67 in FIG. 6 which are used to introduce the gas may be modified to pre-chill the gas which is introduced during the final cooling stages. This modification will produce faster final cooling.

Conversely, the continuous circulation of gas though the interior of the final article may be eliminated by closing the exhaust control means 77 in FIG. 6, or by designing the core rod without the exhaust passageway 72, the air plug 76, and the air plug control apparatus, all of which results in a longer final cooling period or higher ejection temperatures. If the exhaust passageway and plug control apparatus is eliminated, then the gas inlet control means 67 in FIG. 6 is operated in a manner such that the blowing gas may be exhausted back through the normal gas inlet grooves 62, the cross passageways 66 and inlet conduits 64 back into the atomosphere.

Finally, it should be noted that the final article may be blown by top blowing, introducing the blowing gas at the neck or top of the article being formed, as described in the above embodiments, or by bottom blowing. In bottom blowing, gas would be introduced via the gas supply 65 in FIG. 6, inlet control means 67, vent bore 75, vent passageway 75a, spring chamber 100a, exhaust passageway 72, through the tip opening 70 with the plug 76 in the open position, and into the bottom of the article being blown.

As numerous variations and combinations of the embodiments described above are possible, it should be understood that the foregoing description of the preferred embodiments is for purposes of illustration only, and should not be taken as limiting the scope of the present invention as defined in the appended claims.

I claim:

1. An apparatus for forming biaxially oriented articles from thermoplastic materials, said apparatus comprising:
   (a) at least one injection mold defining an injection mold cavity having an open mouth and a horizontal longitudinal axis;
   (b) two blow molds associated with and positioned laterally of each injection mold, each such blow mold defining a blow mold cavity having an open mouth and a horizontal longitudinal axis, the dimensions of each such blow mold cavity being greater than the dimensions of said injection mold cavity;
   (c) two core assemblies corresponding to each injection mold and its associated blow molds, each such assembly including an elongated core rod having a horizontal longitudinal axis and a sleeve surrounding such core rod in the neck area, said sleeves and core rods having respective circumferentially extensive seal surfaces, each such core rod having a parison contact portion which extends outwardly to a parison contact end or tip, each such core rod being slidable relative to the associated sleeve, between a fully retracted position wherein its seal surface sealingly engages the seal surface of the associated sleeve and a fully extended position wherein its seal surface is spaced from the seal surface of the associated sleeve in an outward direction;
   (d) support and transfer means, consisting of conventional injection molding machine platens, press, and lateral shifting mechanism for engaging and disengaging each of said core assemblies alternately with an injection mold and a blow mold, such that the sleeve of the core assembly is within the cavity mouth of the engaged mold and the core rod of the core assembly protrudes into the cavity of said mold, said support and transfer means being constructed and arranged to simultaneously engage one of said core assemblies with an injection mold and one of said core assemblies with a blow mold;
   (e) neck form means, operative during the engagement of each of said core assemblies within an aforesaid mold, for defining the neck extension of the mold cavity and for retaining a parison about the core rod;
   (f) core rod retractor means for retaining the core rod of each of said core assemblies in its fully retracted position while such assembly is engaged within an injection mold, and holding the core rod in this position during lateral transfer to a blow mold until the time the core rod is advanced for axial stretching;
   (g) injection means comprising sprues in the injection mold which allow thermoplastic, in molten form, to be injected via a conventional runner system, into the cavity of each of the said injection molds while one of said core assemblies is engaged therewith to form a parison;
   (h) core rod cooling means comprising interlaced helical channels formed around a cylindrical flow director slug within the core rod wherein coolant is circulated throughout the core rod for maintaining parison contact surfaces of said core rod at cold temperatures relative to the injection temperatures at which the thermoplastic is processed, at least while such core rod is engaged within the injection mold;
   (i) injection and blow mold cooling means for maintaining the cavity surface of each said injection and blow molds at cold temperatures relative to the injection temperatures of the thermoplastic being processed;
   (j) equilibration means for promoting equalization of temperatures across the wall thickness of a parison during the interval between the engagement of the associated core rod within the blow mold and the advancement of the core rod of such assembly during axial stretching of the parison;
   (k) core rod advance means for advancing the core rod of each of said core assemblies to a partially or fully extended position during each engagement of said core assemblies within a blow mold, so that an associated parison thereon may be stretched in an axial direction;
   (l) blow gas passageway means for introducing gas under pressure within each parison while said parison is within a blow mold cavity, at a time not earlier than the aforesaid axial stretching of such parison, to radially expand and stretch the walls of such parison into intimate contact with the blow mold cavity surfaces, such that said parison assumes the final shape of a finished article;

(m) final cooling means for cooling each of said finished articles to a suitable ejection temperature within a blow mold cavity; and (n) means for releasing each finished article from its associated neck form means and for ejecting said finished article from its associated core assembly while said core assemblies are disengaged from said injection mold and blow molds.

2. Apparatus as claimed in claim 1, wherein said blowing gas passageway means includes blow gas inlet conduits and cross passageways formed in the associated core plate and core rod sleeve, and circumferential and axial grooves in the surface of the actuator portion of said core rods for conducting gas into the associated parison.

3. Apparatus as claimed in claim 1, wherein each of said core rods has a tip opening formed in its parison contact end and an exhaust passageway within the core rod extending from such opening through the length of the core rod, and further comprising an air plug slidably mounted within the tip opening of the associated core rod and an open position wherein the air plug does not block the tip opening, said apparatus also including air plug control means to open the air plug for providing exhaust means which allow the continuous circulation of gas through the interior of a parison, and to close the air plug when the continuous circulation of gas is not desired.

4. Apparatus as claimed in claim 3, wherein said air plug control means is constructed and arranged to hold each of said air plugs in the open position for an interval of time after said final blow means expands an associated parison to its final shape, thereby allowing the continuous circulation of blowing gas through the interior of the finished article, such that said preblow means which consists of core rod advance means, blow gas passageway means, air plug and air plug control means, and exhaust passageway means also serve as part of said final cooling means.

5. Apparatus as claimed in claim 3, wherein said air plug control means includes a stem which is affixed to an air plug situated within the tip opening of the core rod at one end, and extending through the length of the core rod within the exhaust passageway terminating in an enlarged head at the other end, said enlarged head being forced by a spring against the surface of a slot formed within a cam, said slot being contoured in such a manner so as to extend or retract the air plug to its open or closed position respectively, when the cam is rotated.

6. Apparatus as claimed in claim 3, wherein said core rod cooling means includes a cylindrical flow director slug having a pair of interlaced helical grooves formed thereon which are situated within a coaxial cylindrical bore in the core rod, such that the flow director slug and the surface of the bore cooperatively define a pair of interlaced helical channels which are not in communication with one another along the length of such slug, said bore and flow director slug further defining a cross-passageway interconnecting the helical channels of the core rod at a parison contact end or tip of such core rod, and wherein said core rod cooling means includes means for forcing a cooling liquid through one of said helical channels, through said cross-passageway, and then returning said fluid through the other one of said helical channels.

7. Apparatus as claimed in claim 3, wherein a plurality of core assemblies, a plurality of injection molds, and a plurality of blow molds are mounted in vertical rows to a core plate and a mold plate respectively, said plurality being limited in number by the space available on such mold and core plate, so that said mold plate and core plate may be mounted on platens within the injection molding machine, wherein said core plate and mold plate are included in said support and transport means, and such support and transport means include press means for moving said core plate toward and away from said mold plate.

8. Apparatus as claimed in claim 7, wherein said support and transfer means include lateral shift means for moving said core plate laterally of said mold plate through a predetermined shift distance between a first lateral position and a second lateral position, such that a given row of said core assemblies may be alternately aligned with and engaged with a corresponding vertical row of injection molds and blow molds, so that parisons may be formed and cooled within the injection molds simultaneously with the equilibration, stretching, blowing, and cooling operations taking place within the horizontally adjacent blow molds.

9. Apparatus as claimed in claim 8, wherein the number of vertical rows of core assemblies mounted to said core plate is always two times the number of vertical rows of injection molds mounted to said mold plate, and the number of vertical rows of blow molds is one greater than the number of vertical rows of injection molds, such that one half the number of rows of core assemblies are engaged within the injection molds when the press is closed and the other one half of the vertical rows of core assemblies are simultaneously engaged within the blow molds thereby leaving one extra vertical row of blow molds vacant at the extreme right or left of said mold plate depending upon which lateral position the core plate is in during that cycle.

* * * * *